United States Patent Office 2,923,083
Patented Feb. 2, 1960

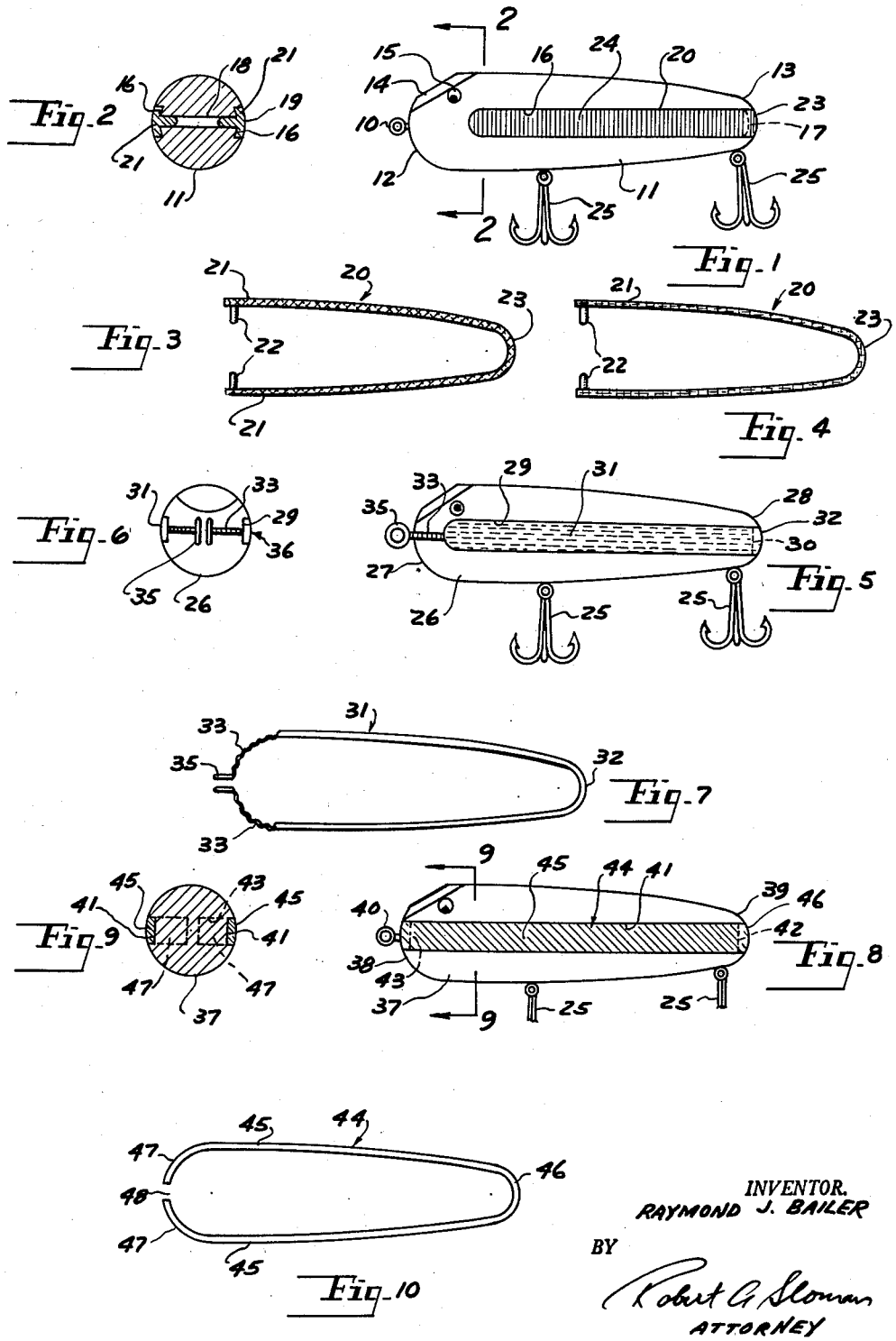

2,923,083

FISHING LURE

Raymond J. Bailer, Richmond, Mich.

Application February 25, 1957, Serial No. 642,230

1 Claim. (Cl. 43—42.09)

This invention relates to fishing lures together with removable and interchangeable color strips which extend along and around the lure body for changing the lure appearance.

Heretofore the average fisherman carried a large quantity of lures of different colors, one or more of which may be more successful on a particular day or at a particular location. The difficulty exists in the number of lures required, as it has been found by many fishermen that one particular color or a particular shape is more satisfactory than another for one type of fish.

It is the primary object of the present invention to provide a versatile artificial lure which may be used for a number of these situations merely by providing therefor removable and interchangeable bands of different colors.

It is a further object of the present invention to provide an elongated slot which extends longitudinally throughout the sides of the lure body and over its rounded end or ends and which is adapted to removably receive differently colored U-shaped strips.

It is a further object to provide a series of differently colored U-shaped strips made from spring steel, resilient plastic, or other resilient material whereby said strips may be self-securing if desired within the said slot.

It is still a further object of the present invention to provide a longitudinally extending slot which extends substantially around the lure body covering portions of the sides and the front and rear and within which is removably secured differently colored strips of material to thereby provide from the one lure body a plurality of differently appearing lures.

These and other objects will be seen from the following specification and claim in conjunction with the appended drawing in which:

Fig. 1 is a side elevational view of a lure with the present removable U-shaped color strip thereon, hatched to designate a red color.

Fig. 2 is a section taken on line 2—2 of Fig. 1.

Fig. 3 is a plan view of said strip, hatched to designate an orange color.

Fig. 4 is similar view of a strip hatched to indicate a gold color.

Fig. 5 is a side elevational view of a lure similar to Fig. 1 but including securing extensions at the forward ends of the color strip, which strip is hatched for silver.

Fig. 6 is a left end elevational view thereof.

Fig. 7 is a plan view of the color strip in Fig. 5.

Fig. 8 is a fragmentary side elevational view of a lure having a slightly different form of removable color strip, hatched for a green color.

Fig. 9 is a section taken on line 9—9 of Fig. 8.

Fig. 10 is a plan view of the color strip in Fig. 8.

It will be understood that the above drawing illustrates several preferred embodiments of the invention, and that other embodiments are contemplated within the scope of the claim hereafter set forth.

Referring to the drawing, there is shown in Fig. 1, a somewhat conventional lure body 11 with rounded ends 12, 13, a tapered and flattened face 14 with artificial eyes 15, and a line securing eyelet 10.

An elongated slot 16 is formed within body 11 and extends along opposite sides of the body and around its rear end as indicated at 17. The forward ends of the slot terminate in the transverse or radial bore 18.

The U-shaped color strip 20 made of spring steel, or an elastic plastic or other resilient material consists of a pair of free end portions 21 and an arcuate bight 23 adapted for snug nesting respectively within the slots 16 and 17 in body 11.

The forward ends 21 of color strip 20 have radially projecting pins 22 which are of such diameter and size as to be snugly and frictionally projected within bore 18 for further securing color strip 20 within the said slots.

This securing is further attained by the inherent resiliency of strip 20 plus the fact that said strip is adapted to snugly and frictionally project within the said slots.

The said slots are of a cross sectional shape and of such depth as to cooperatively receive color strip 20 so that its outer contour 19, Fig. 2, blends with and is preferably within the contour of the lure body. The outer surface of strip 20, and as illustrated at 24, Fig. 1, is hatched to indicate a red color, for illustration. The strip in Fig. 3 is shown hatched for a different color, such as orange, for illustration.

The present invention contemplates that the strips 20, or at least the outer surfaces thereof as at 19, Fig. 2, will be of different colors and may be readily interchanged as desired. The lure construction is completed in Fig. 1 by the application of suitable gang hooks 25.

Fig. 4 is similar to Fig. 3 and merely indicates the usage of a different colored strip 20, hatched for gold color.

Figs. 5, 6, and 7 illustrate another embodiment of the present invention wherein the lure body 26, with hooks 25 and with rounded ends 27, 28, has formed along its opposite sides a similar slot or groove 29, which also extends around the rear end of the lure body as at 30.

A U-shaped color strip 31 having a resilient character as above descriped is adapted to be removably and snugly nested within the slot 29, with its bight 32 nested within the end slot 30 whereby said strip is disposed within the contour of the lure body as indicated at 36 in Fig. 6.

A pair of opposed arcuate wires 33 are joined at their one ends to the free ends of strip 31. The other ends of the wires 33 terminate in the outturned spaced eyelets 35.

The wires 33 are adapted to snugly engage the round front end 27 of the lure body. The eyelets 35 will be drawn together in engaging relation as shown in Fig. 6 when the fishline is projected therethrough and tightened.

A slight variation is shown in Figs. 8, 9 and 10 wherein the conventional lure body 37 with rounded ends 38 and 39 is provided with a line fastening eyelet 40 at its forward end.

An elongated continuous longitudinally extending slot 41 is formed along the sides of body 37 and extends around the rear end thereof as indicated at 42. The said slot 41 also has forward portions 43 which extend around substantially the front end 38 of body 37 terminating short of eyelet 40.

There is provided an elongated U-shaped strip 44 of suitable flexible material, such as spring steel or plastic, whose free end portions 45 and whose arcuate bight 46 are snugly nested within the above described continuous slot 41 and 42.

The forward free ends of strip 44 are curved inwardly as at 47 and are nested snugly within the slot extensions 43 in said body in opposed relation, there being a slight spacing between said free ends as at 48, Fig. 10. By this construction the color strip 44 which, for illustration, has been hatched for a green color, is removably nested snugly and frictionally within the above described body slots. Strip 44 accordingly extends substantially and completely around the exterior sides, front, and rear of said body.

In the present preferred embodiment the slots 41, 42 and 43 are of such depth and size as to completely receive strip 44 within the contour of body 37. It is contemplated, however, that said strips may be of such thickness as to project outwardly of the body contour to the extent desired.

Having described my invention, reference should now be had to the claim which follows.

I claim:

In a fishing lure, an elongated rounded end tapered body with opposed elongated transversely convex sides and having a plurality of depending gang hooks, there being an elongated narrow continuous laterally opening slot of predetermined cross sectional shape extending along the horizontal medial plane of the body formed within and along the sides and rear of the body midway of its height, and a distinctively colored U-shaped resilient strip of the same shape as said slot snugly and retainingly nested in frictional contact with said body within said slot, said strip being removable and interchangeable with similar strips of different colors, said slot having an extension over and within the front end of the body, the free ends of said strip being curved inwardly and nested within said slot extension in opposed relation whereby said strip extends substantially around said body longitudinally thereof, the frictional contact with said body when said strip is nested within said slot constituting the sole means for retaining said strip on said body.

References Cited in the file of this patent

UNITED STATES PATENTS

| | | |
|---|---|---|
| 1,740,335 | Cowan | Dec. 17, 1929 |
| 2,482,466 | Cooper | Sept. 20, 1949 |
| 2,502,562 | Fike | Apr. 4, 1950 |
| 2,517,157 | Adams | Aug. 1, 1950 |
| 2,612,716 | Hedland | Oct. 7, 1952 |
| 2,796,693 | Gunterman | June 25, 1957 |